United States Patent
Yamanaka

(10) Patent No.: US 11,478,813 B2
(45) Date of Patent: Oct. 25, 2022

(54) LIQUID APPLICATION UNIT WITH APPLICATION NEEDLE FOR APPLYING LIQUID MATERIAL ON TARGET, AND LIQUID APPLICATION APPARATUS INCLUDING LIQUID APPLICATION UNIT

(71) Applicant: NTN CORPORATION, Osaka (JP)

(72) Inventor: Akihiro Yamanaka, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/488,915

(22) PCT Filed: Feb. 22, 2018

(86) PCT No.: PCT/JP2018/006575
§ 371 (c)(1),
(2) Date: Aug. 26, 2019

(87) PCT Pub. No.: WO2018/155589
PCT Pub. Date: Aug. 30, 2018

(65) Prior Publication Data
US 2020/0038900 A1 Feb. 6, 2020

(30) Foreign Application Priority Data

Feb. 27, 2017 (JP) .............................. JP2017-034957

(51) Int. Cl.
*B05C 1/02* (2006.01)
*B05C 11/10* (2006.01)
(Continued)

(52) U.S. Cl.
CPC .................. *B05C 1/02* (2013.01); *B05C 5/00* (2013.01); *B05C 5/0225* (2013.01); *B05C 11/00* (2013.01);
(Continued)

(58) Field of Classification Search
CPC .............. B05C 1/02; B05C 5/00; B05C 11/10
See application file for complete search history.

(56) References Cited

U.S. PATENT DOCUMENTS

2011/0132109 A1  6/2011  Delaage

FOREIGN PATENT DOCUMENTS

| CN | 1840356 A | 10/2006 |
| CN | 101047090 A | 10/2007 |

(Continued)

OTHER PUBLICATIONS

International Search Report issued in corresponding International Patent Application No. PCT/JP2018/006575, dated May 15, 2018, with English translation.

(Continued)

*Primary Examiner* — Binu Thomas
(74) *Attorney, Agent, or Firm* — McDermott Will & Emery LLP

(57) ABSTRACT

A liquid application unit and a liquid application apparatus are provided, for which a liquid material can be readily resupplied or replaced. A liquid application unit includes: a plurality of application needle units each including an application needle and a liquid material container in which the liquid material is stored and from which the liquid material is supplied to the application needle; and a first driving unit configured to move the application needle relative to a target and the liquid material container in a first direction. The plurality of application needle units are integrally attachable to and detachable from the first driving unit.

14 Claims, 10 Drawing Sheets

(51) Int. Cl.
  *B05C 5/02*    (2006.01)
  *B05C 5/00*    (2006.01)
  *B05C 11/00*   (2006.01)
  B01L 3/02     (2006.01)
  B05D 7/24     (2006.01)

(52) U.S. Cl.
  CPC .......... *B05C 11/10* (2013.01); *B05C 11/1034* (2013.01); *B01J 2219/00373* (2013.01); *B01L 3/0244* (2013.01); *B05D 7/24* (2013.01)

(56) References Cited

FOREIGN PATENT DOCUMENTS

| | | | |
|---|---|---|---|
| CN | 105813765 A | 7/2016 | |
| CN | 105828958 A | 8/2016 | |
| JP | 2006-276188 A | 10/2006 | |
| JP | 2006276188 A * | 10/2006 | |
| JP | 2006-310266 A | 11/2006 | |
| JP | 2009-151261 A | 7/2009 | |
| JP | 2011-516875 A | 5/2011 | |
| JP | 2015-112577 A | 6/2015 | |
| JP | 2016-049524 A | 4/2016 | |
| JP | 2016049524 A * | 4/2016 | |
| WO | WO-2015087899 A1 * | 6/2015 | ............. H05K 3/125 |

OTHER PUBLICATIONS

Chinese Office Action issued in corresponding Chinese Patent Application No. 201880013944.9, dated Nov. 19, 2020, with English translation.
European Search Report issued in corresponding European Patent Application No. 18756923.1, dated Dec. 16, 2020.

* cited by examiner (a) (b)

LIQUID APPLICATION UNIT WITH APPLICATION NEEDLE FOR APPLYING LIQUID MATERIAL ON TARGET, AND LIQUID APPLICATION APPARATUS INCLUDING LIQUID APPLICATION UNIT

CROSS-REFERENCE TO RELATED APPLICATIONS

This application is the U.S. National Phase under 35 U.S.C. § 371 of International Application No. PCT/JP2018/006575, filed on Feb. 22, 2018, which claims the benefit of Japanese Application No. 2017-034957, filed on Feb. 27, 2017, the entire contents of each are hereby incorporated by reference.

TECHNICAL FIELD

The present invention relates to a liquid application unit and a liquid application apparatus, and also relates to a liquid application unit and a liquid application apparatus each for applying a liquid material to a target using an application needle.

BACKGROUND ART

In recent years, biochips are used in inspections and the like for identifying a pathogen for the purpose of finding diseases in an early stage.

A plurality of antibody materials and the like are applied in advance to one biochip, for example, such that a plurality of types of diseases can be examined in one inspection. In this case, the bonding state of an antigen and each antibody material on one biochip is examined to identify a foreign substance containing this antigen.

The method of applying an antibody material to a biochip includes a dispenser scheme, an ink jet scheme, an application needle scheme, and the like.

In the application needle scheme, a liquid application unit disclosed in Japanese Patent Laying-Open No. 2015-112577 is used. The liquid application unit allows an extremely fine application to be performed at high speed and with stability.

Furthermore, by using a plurality of liquid application units disclosed in Japanese Patent Laying-Open No. 2015-112577, a plurality of types of liquid materials can be applied to one target to which a material is applied, as in the case of the above-mentioned biochip.

CITATION LIST

Patent Literature

PTL 1: Japanese Patent Laying-Open No. 2015-112577

SUMMARY OF INVENTION

Technical Problem

However, for example, in the case where a plurality of types of liquid materials are applied to each of a plurality of targets to which a liquid material is applied, at least either of each of the plurality of application needles and each of the plurality of liquid materials may need to be simultaneously resupplied or replaced. In this case, according to the above-described liquid application unit, a plurality of application needles in their respective liquid application units need to be separately replaced, and also, a liquid material needs to be resupplied to each of a plurality of liquid material containers separately. Then, driving of each of the plurality of liquid application units needs to be stopped from the start to the end of the resupplying operation.

The present invention has been made in order to solve the above-described problems. A main object of the present invention is to provide a liquid application unit and a liquid application apparatus, for which at least either of a plurality of application needles and a plurality of liquid materials can be readily resupplied or replaced.

Solution to Problem

A liquid application unit according to the present invention serves as a liquid application unit for applying a liquid material onto a surface of a target using an application needle. The liquid application unit includes: a plurality of application needle units each including the application needle and a liquid material container in which the liquid material is stored and from which the liquid material is supplied to the application needle; and a first driving unit configured to move the application needle relative to the target and the liquid material container in a first direction. The plurality of application needle units are integrally attachable to and detachable from the first driving unit.

A liquid application apparatus according to the present invention includes: the liquid application unit; and a holding base configured to hold the target.

Advantageous Effects of Invention

According to the present invention, a liquid application unit and a liquid application apparatus can be provided, for which at least either of a plurality of application needles and a plurality of liquid materials can be readily resupplied or replaced.

DESCRIPTION OF EMBODIMENTS

Figure 1:
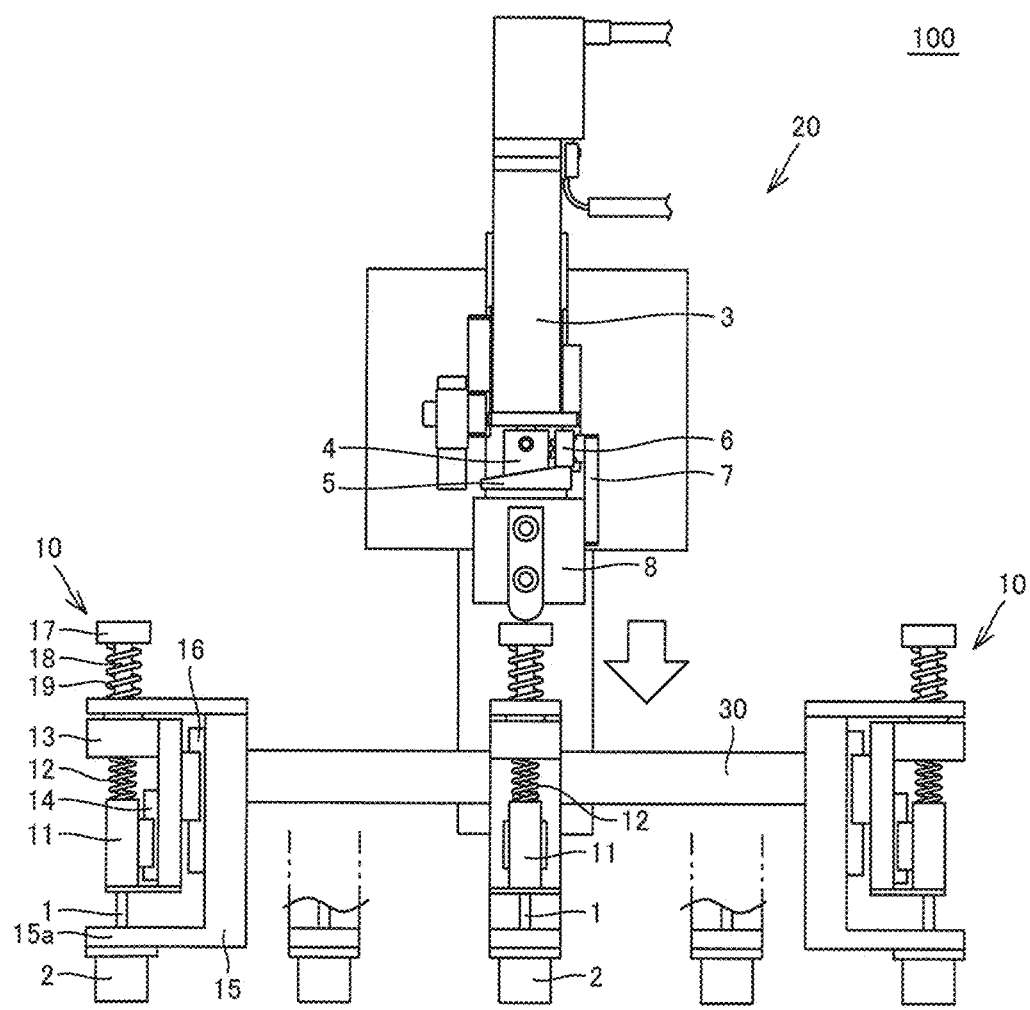
FIG. 1 is a front view showing a liquid application unit according to the present embodiment.

The embodiments of the present invention will be hereinafter described with reference to the accompanying drawings, in which the same or corresponding components are designated by the same reference characters, and the description thereof will not be repeated.

<Configuration of Liquid Application Unit>

Figure 2:
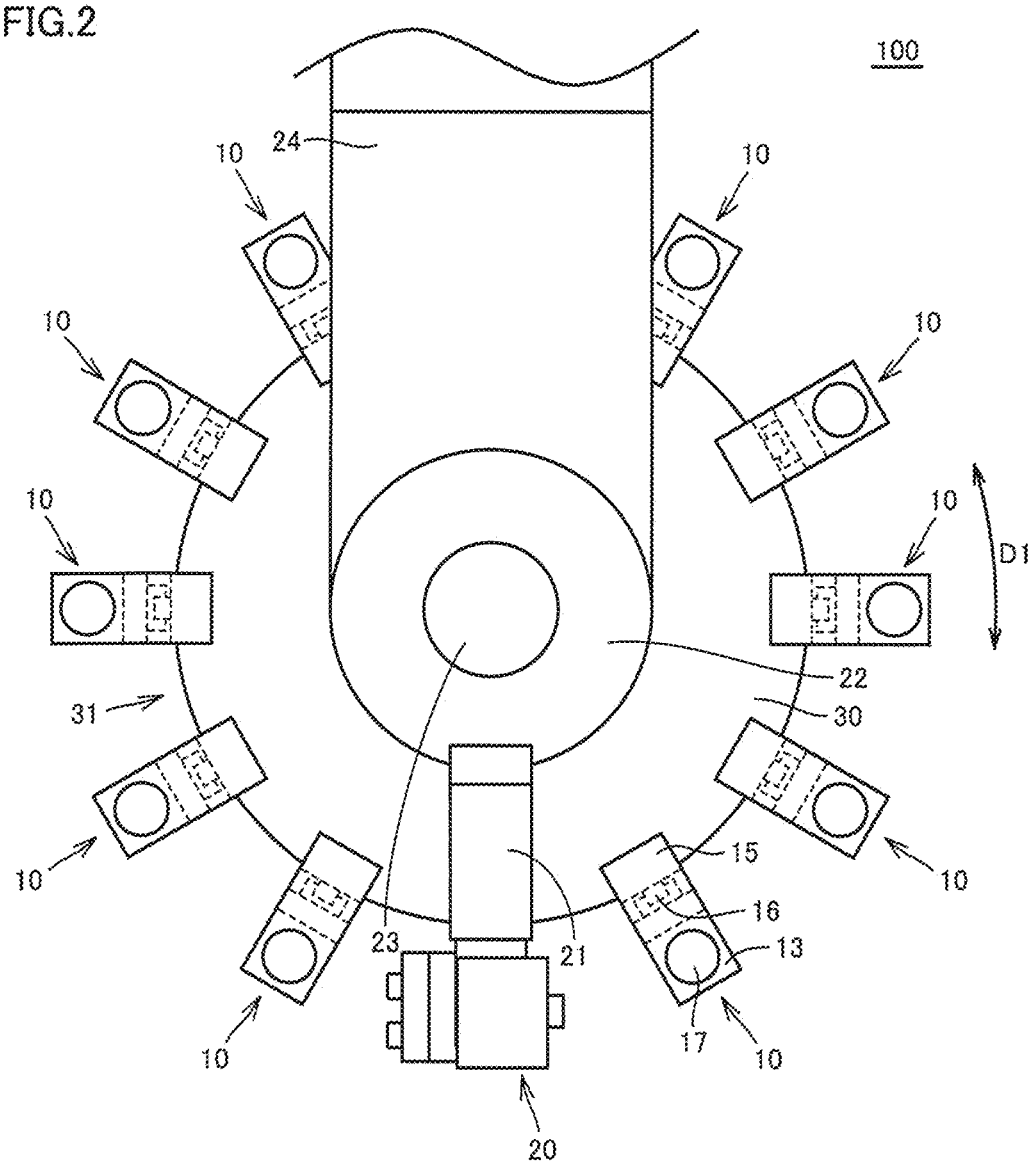
FIG. 2 is a top view of the liquid application unit shown in FIG. 1.

As shown in FIGS. 1 and 2, a liquid application unit 100 according to the present embodiment includes a plurality of application needle units 10 and one first driving unit 20.

As shown in FIGS. 1 and 2, each of the plurality of application needle units 10 includes: an application needle 1; and a liquid material container 2 in which a liquid material is stored and from which the liquid material is supplied to application needle 1.

As shown in FIGS. 1 and 2, first driving unit 20 moves application needle 1 in the first direction relative to a substrate 140 (see FIG. 5) as a target to which the liquid material is applied and liquid material container 2. The first direction may be any direction, but may be the gravity direction, for example. First driving unit 20 includes a servo motor 3 as a driving source, for example, a cam member 5, a bearing 6, a connection member 7, and a movable unit 8. Cam member 5 is attached to a rotation member 4 of servo motor 3 and rotated about the rotation axis of rotation member 4 together with rotation member 4. The rotation axis of rotation member 4 is located to extend in the first direction. Cam member 5 has a surface that is located on the side of servo motor 3 and that is formed as an annular cam surface disposed to surround rotation member 4. The cam surface has: two surface portions, for example, that are orthogonal to the first direction and that are different in distance from servo motor 3 in the first direction; and two surface portions that cross the first direction and that connect the above-mentioned two surface portions. The cam surface is in contact with the outer circumferential surface of the outer ring of bearing 6. The inner ring of bearing 6 is connected to movable unit 8 via connection member 7. Bearing 6, connection member 7 and movable unit 8 are fixed at their respective positions relative to servo motor 3, rotation member 4 and cam member 5 in the rotation direction of rotation member 4. When cam member 5 is rotated by servo motor 3, bearing 6, connection member 7 and movable unit 8 reciprocate in the first direction. Thereby, liquid application unit 100 can be switched between the first state and the second state. In the first state, application needle unit 10 is not driven by first driving unit 20. In the second state, application needle unit 10 is driven by first driving unit 20 to bring application needle 1 into contact with substrate 140 as a target, thereby allowing application of a liquid material thereto. In addition, FIGS. 1 to 4 each show liquid application unit 100 in the first state.

As shown in FIGS. 1 and 2, each of the plurality of application needle units 10 includes: a driven portion driven by first driving unit 20; and a fixation portion that is not driven by first driving unit 20 and that is fixed at the position relative to servo motor 3.

As shown in FIGS. 1 and 2, for example, the driven portion includes application needle 1, an application needle support portion 11, a first spring 12 (an elastic portion), a moving portion 13, a first guide member 14, a passive portion 17, a transmission portion 18, and a second spring 19 (each of which will be described later in detail). The fixation portion includes liquid material container 2, a base portion 15, and a second guide member 16 (a guide portion), for example.

As shown in FIGS. 1 and 2, liquid application unit 100 further includes a coupling portion 30 that couples the fixation portions of the plurality of respective application needle units 10. Coupling portion 30 is connected to each of base portions 15 of the plurality of respective application needle units 10, for example, so as to couple base portions 15 to each other. Coupling portion 30 has a circular outer shape, for example, in a view seen in the first direction. Each of the plurality of application needle units 10 is connected to the outer circumference of coupling portion 30, for example. Also, the plurality of application needle units 10 are spaced apart from each other along this outer circumference. Coupling portion 30 is connected to first driving unit 20 only through application needle unit 10. In other words, the plurality of application needle units 10 and coupling portion 30 are integrally attachable to and detachable from first driving unit 20.

As shown in FIG. 2, liquid application unit 100 further includes a second driving unit 23 that changes the relative positional relation between the plurality of application needle units 10 and first driving unit 20. Second driving unit 23 changes the relative positional relation between the plurality of application needle units 10 and first driving unit 20 in a circumferential direction D1 with respect to the straight line extending in the first direction. Second driving unit 23 includes a servo motor, for example. Coupling portion 30 is attached to the rotation member of second driving unit 23 in an attachable and detachable manner and rotated about the rotation axis of the rotation member together with this rotation member. In a view of liquid application unit 100 seen in the first direction, the rotation axis of second driving unit 23 is located to coincide with the center of coupling portion 30. The rotation axis of this rotation member is located to extend in the first direction.

First driving unit 20 and second driving unit 23 are integrally formed, for example. First driving unit 20 is connected to a support portion 22, for example, through first connection portion 21. Second driving unit 23 is connected to support portion 22. The positional relation of first driving unit 20 and second driving unit 23 relative to support portion 22 is fixed. Movable unit 8 of first driving unit 20 is disposed, for example, on the circumference with respect to the rotation axis of second driving unit 23. Support portion 22 is connected to a moving body of a Z-axis table 120 in a liquid application apparatus 200 (which will be described later) through a second connection portion 24. Second driving unit 23 is connected to application needle unit 10 only through first driving unit 20 or coupling portion 30.

Thereby, the plurality of application needle units 10 and coupling portion 30 are integrally attachable to and detachable from first driving unit 20 and second driving unit 23.

<Configuration of Application Needle Unit>

As shown in FIGS. 1 to 4, application needle unit 10 includes application needle 1, application needle support portion 11, first spring 12, moving portion 13, first guide member 14, base portion 15, second guide member 16, passive portion 17, transmission portion 18, and second spring 19.

Application needle 1 extends in the first direction. One end of application needle 1 in the first direction (the end of application needle 1 located on the side away from servo motor 3) serves as a needle tip that may be brought into contact with substrate 140 (see FIG. 5) as a target. The other end of application needle 1 in the first direction is connected to application needle support portion 11 and supported thereby.

One end of application needle support portion 11 in the first direction (the end of application needle support portion 11 located on the side away from servo motor 3) is connected to the above-mentioned other end of application needle 1 in the first direction. The other end of application needle support portion 11 in the first direction is connected to one end of first spring 12 in the first direction (the end of first spring 12 located on the side away from servo motor 3). Application needle support portion 11 is located closer to servo motor 3 in the first direction than liquid material container 2 is.

The other end of first spring 12 in the first direction (the end of first spring 12 located closer to servo motor 3) is connected to the surface (for example, the lower surface) of the other end of moving portion 13 in the first direction (the end of moving portion 13 located closer to servo motor 3), the surface being located on the side away from servo motor 3. First spring 12 may bias application needle 1 and application needle support portion 11 relative to moving portion 13 in the first direction. The spring constant of first spring 12 may be set, for example, in accordance with the strength of substrate 140.

A stopper portion 13a is disposed at one end of moving portion 13 in the first direction (the end of moving portion 13 located on the side away from servo motor 3). Stopper portion 13a and the above-mentioned other end of moving portion 13 in the first direction are disposed to face each other with application needle support portion 11 and first spring 12 interposed therebetween in the first direction. Stopper portion 13a is disposed such that it faces, in the first direction, the above-mentioned one end of application needle support portion 11 in the first direction. Stopper portion 13a is located more distant from servo motor 3 in the first direction than application needle support portion 11 is. Stopper portion 13a is located closer to servo motor 3 in the first direction than liquid material container 2 is. Stopper portion 13a is provided with a through hole (not shown). The through hole has a hole axis extending in the first direction. Application needle 1 is inserted through the through hole of stopper portion 13a. The through hole of stopper portion 13a is disposed so as not to interfere with application needle 1.

Figure 3:
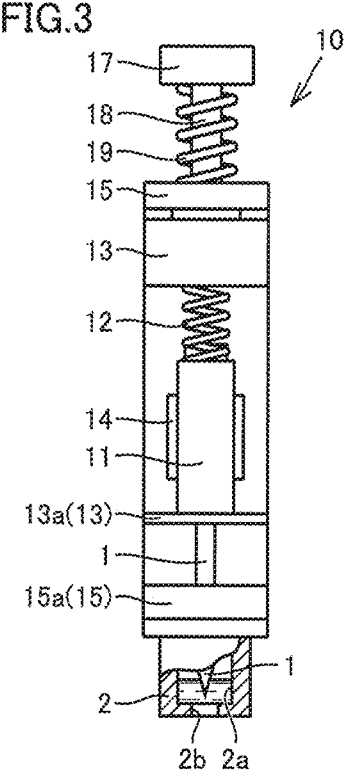
FIG. 3 is a front view showing an application needle unit in the liquid application unit shown in FIG. 1.
Figure 4:
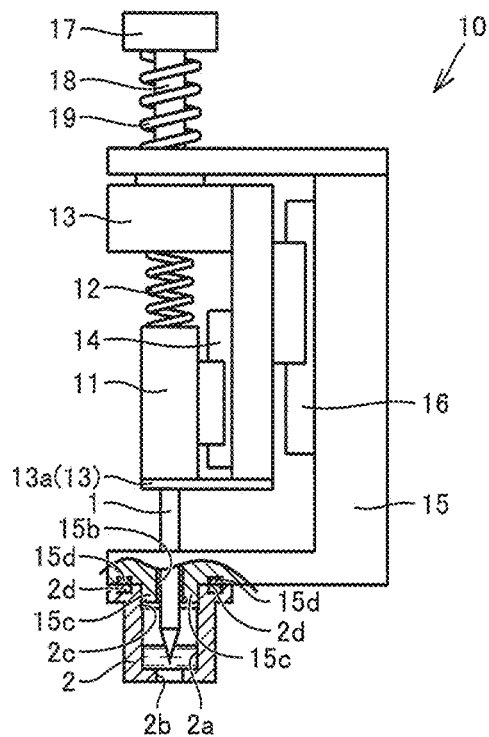
FIG. 4 is a side view of the application needle unit shown in FIG. 3.
Figure 5:
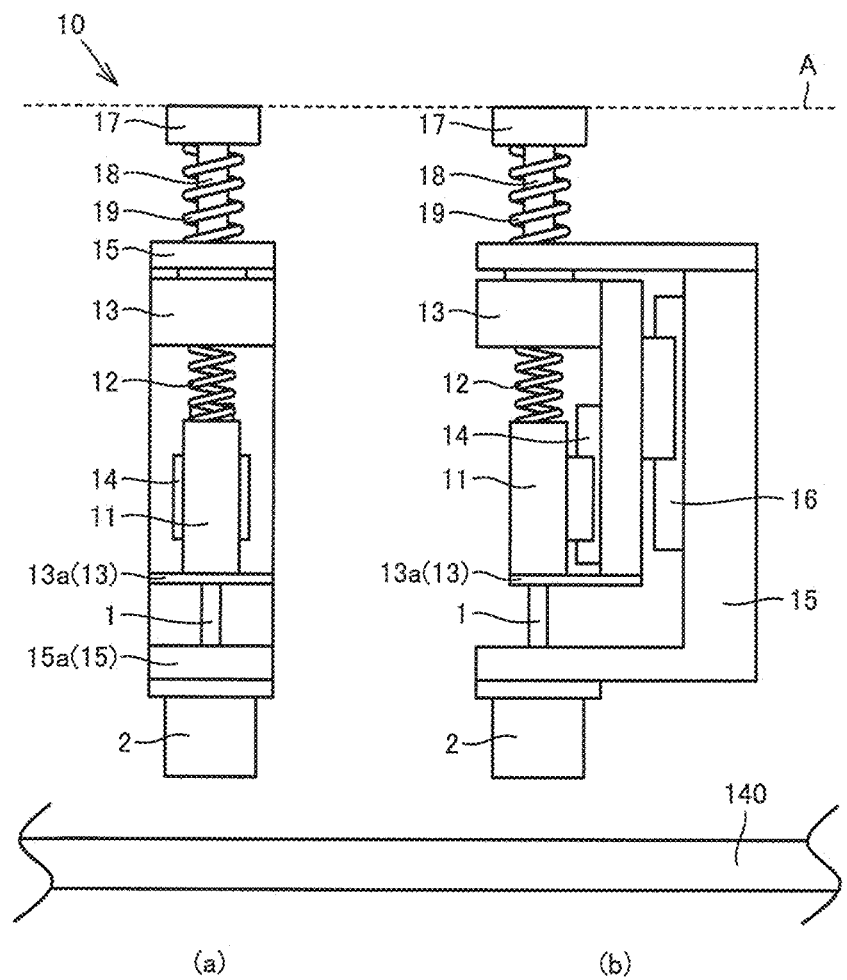
FIG. 5(*a*) is a front view showing the first state of the application needle unit shown in FIG. 3, and FIG. 5(*b*) is a side view of the application needle unit shown in FIG. 5(*a*).

As shown in FIGS. 3 and 4, the above-mentioned other end of moving portion 13 in the first direction is connected to one end of transmission portion 18 in the first direction (the end of transmission portion 18 located on the side away from servo motor 3).

As shown in FIGS. 3 and 4, in the first state where application needle unit 10 is not driven by first driving unit 20, the surface (for example, the lower surface) of the above-mentioned one end of application needle support portion 11, which is located on the side away from servo motor 3, is in contact with the surface (for example, the upper surface) of stopper portion 13a located closer to servo motor 3.

First guide member 14 allows movement of application needle support portion 11 relative to moving portion 13 in the first direction. First guide member 14 restricts movement of application needle support portion 11 relative to moving portion 13 in the direction perpendicular to the first direction. First guide member 14 has a plurality of (for example, three) surfaces extending in the first direction. Application needle support portion 11 has a plurality of (for example, three) surfaces that are disposed to face each of the plurality of above-mentioned surfaces of first guide member 14 in the direction perpendicular to the first direction and to extend in the first direction. The plurality of surfaces of first guide member 14 include surfaces that face one side and the other side in the direction orthogonal to the first direction. The plurality of surfaces of application needle support portion 11 include surfaces that face one side and the other side in the direction orthogonal to the first direction.

A container holding portion 15a is disposed at one end of base portion 15 in the first direction (the end of base portion 15 located on the side away from servo motor 3). Container holding portion 15a and the other end of base portion 15 in the first direction are disposed to face each other with moving portion 13 interposed therebetween in the first direction. Container holding portion 15a is disposed to face stopper portion 13a of moving portion 13 in the first direction. The other end of base portion 15 in the first direction is disposed to face, in the first direction, the above-mentioned other end of moving portion 13 in the first direction. Container holding portion 15a is located more distant from servo motor 3 in the first direction than moving portion 13 is.

As shown in FIG. 4, container holding portion 15a is provided with a through hole 15b. The hole axis of through hole 15b extends in the first direction. Application needle 1 is inserted through the through hole 15b of container holding portion 15a. The through hole of container holding portion 15a is disposed so as not to interfere with application needle 1.

Container holding portion 15a has a protruding portion 15c that protrudes to be away from servo motor 3 in the first direction. Furthermore, container holding portion 15a has a magnet 15d disposed so as to surround protruding portion 15c. Protruding portion 15c and magnet 15d are disposed, for example, so as to surround through hole 15b. In other words, protruding portion 15c and magnet 15d have an annular shape, for example, in a plan view seen in the first direction.

As shown in FIG. 4, liquid material container 2 is provided with: a space 2a in which a liquid material is stored; and a first hole 2b and a second hole 2c through which application needle 1 is inserted into space 2a. First hole 2b is located more distant from servo motor 3 (closer to substrate 140) than space 2a is. Second hole 2c is located on the opposite side of first hole 2b with respect to space 2a. Liquid material container 2 is inlaid in container holding portion 15a of base portion 15 so as to prevent first hole 2b and second hole 2c from interfering with application needle 1 in the plane surface crossing the first direction.

The other end of base portion 15 in the first direction (the end of base portion 15 located on the side closer to servo motor 3) is provided with a through hole (not shown). The hole axis of the through hole extends in the first direction. Transmission portion 18 is inserted through the through hole of base portion 15. The through hole of base portion 15 is located so as not to interfere with transmission portion 18.

Second guide member 16 allows movement of moving portion 13 relative to base portion 15 in the first direction. Second guide member 16 restricts movement of moving portion 13 relative to base portion 15 in the direction perpendicular to the first direction. Second guide member 16 has the same configuration as that of first guide member 14, for example. In other words, second guide member 16 has a plurality of (for example, three) surfaces extending in the first direction. Moving portion 13 has a plurality of (for example, three) surfaces that are disposed to face each of the plurality of above-mentioned surfaces of second guide member 16 in the direction perpendicular to the first direction and to extend in the first direction. The plurality of surfaces of second guide member 16 include surfaces that face one side and the other side in the direction orthogonal to the first direction. The plurality of surfaces of moving portion 13 include surfaces that face one side and the other side in the direction orthogonal to the first direction.

One end of passive portion 17 in the first direction (the end of passive portion 17 located on the side away from servo motor 3) is connected to the other end of transmission portion 18 in the first direction (the end of transmission portion 18 located closer to servo motor 3). The other end of passive portion 17 in the first direction (the end of passive portion 17 located closer to servo motor 3) is located more distant from servo motor 3 in the first direction than movable unit 8 of first driving unit 20 is and provided to be able to contact movable unit 8. In a different point of view, the above-mentioned other end of passive portion 17 in the first direction is connected to movable unit 8 of first driving unit 20 in an attachable and detachable manner.

One end of transmission portion 18 in the first direction (the end of transmission portion 18 located on the side away from servo motor 3) is connected to the above-mentioned other end of base portion 15 in the first direction. The other end of transmission portion 18 in the first direction is connected to the above-mentioned one end of passive portion 17 in the first direction.

One end of second spring 19 in the first direction is connected to the above-mentioned other end of base portion 15 in the first direction. The other end of second spring 19 in the first direction is connected to the above-mentioned other end of passive portion 17 in the first direction. Second spring 19 may bias passive portion 17 in the first direction relative to base portion 15 that is fixed at the position relative to first driving unit 20.

<Operation of Application Needle Unit>

First, as shown in FIGS. 5(a) and 5(b), application needle unit 10 in the above-mentioned first state shown in FIGS. 3 and 4 is disposed at the position where it can apply a liquid material to a prescribed position of substrate 140. Thereby, liquid material container 2, base portion 15 and second guide member 16 each serving as a fixation portion of application needle unit 10 are positioned relative to substrate 140.

Then, as shown in FIGS. 6(a) and 6(b), the above-mentioned driven portion of application needle unit 10 is driven by first driving unit 20, thereby bringing application needle 1 into contact with substrate 140. Specifically, first driving unit 20 is first driven such that movable unit 8 and passive portion 17 brought into contact with movable unit 8 are moved toward substrate 140. Moving portion 13 connected to passive portion 17 through transmission portion 18 is guided by second guide member 16 relative to liquid material container 2 and base portion 15 that are positioned relative to substrate 140, so that moving portion 13 is moved in the first direction toward substrate 140. At this time, application needle 1 and application needle support portion 11 are biased by first spring 12 toward substrate 140 relative to moving portion 13 that moves toward substrate 140. Accordingly, in application needle unit 10, the relative positional relation among application needle 1, application needle support portion 11, first spring 12, and moving portion 13 in the first state is maintained until application needle 1 comes into contact with substrate 140.

Figure 6:
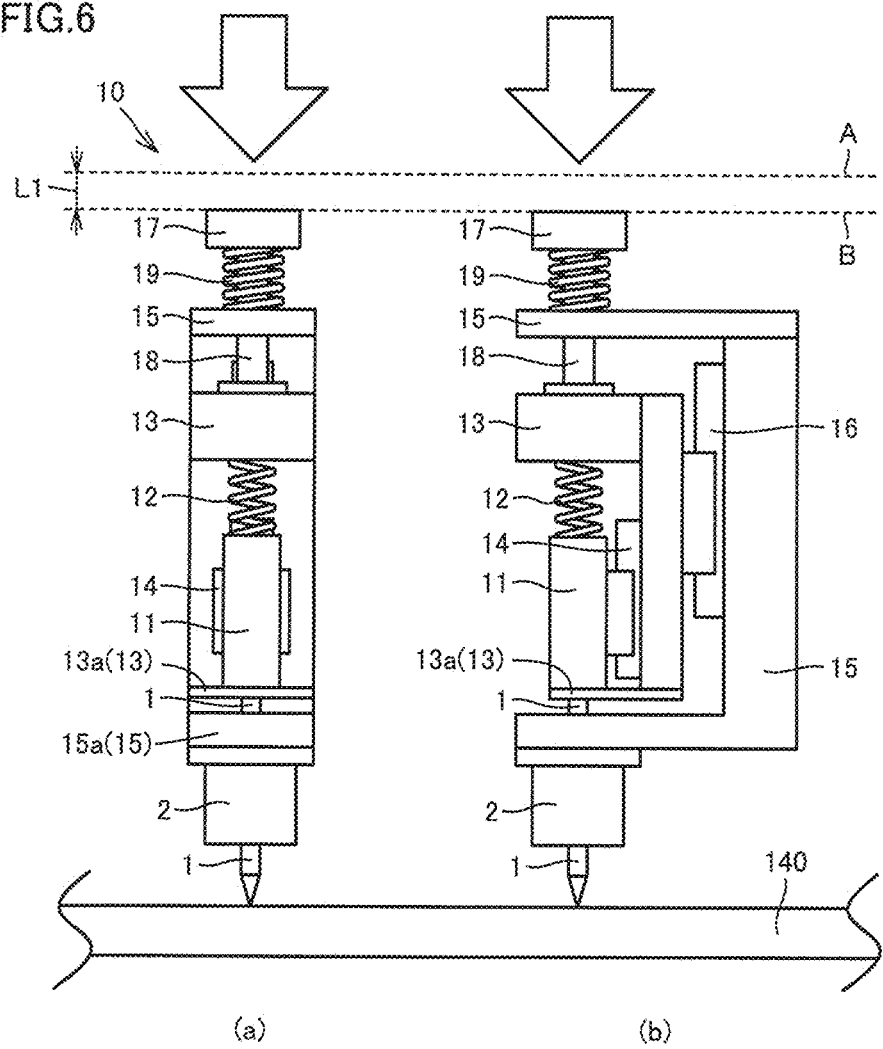
FIG. 6(*a*) is a front view showing the second state of the application needle unit shown in FIG. 3, and FIG. 6(*b*) is a side view of the application needle unit shown in FIG. 6(*a*).

In other words, from the first state shown in FIGS. 5(a) and 5(b) to the second state shown in FIGS. 6(a) and 6(b), the moving distance of application needle 1 in the first direction is equal to a moving distance L1 (see FIG. 6) of movable unit 8 and passive portion 17 in the first direction. Furthermore, the moving distance of application needle 1 in the first direction is equal to the amount of change in length of second spring 19 in the first direction.

Figure 7:
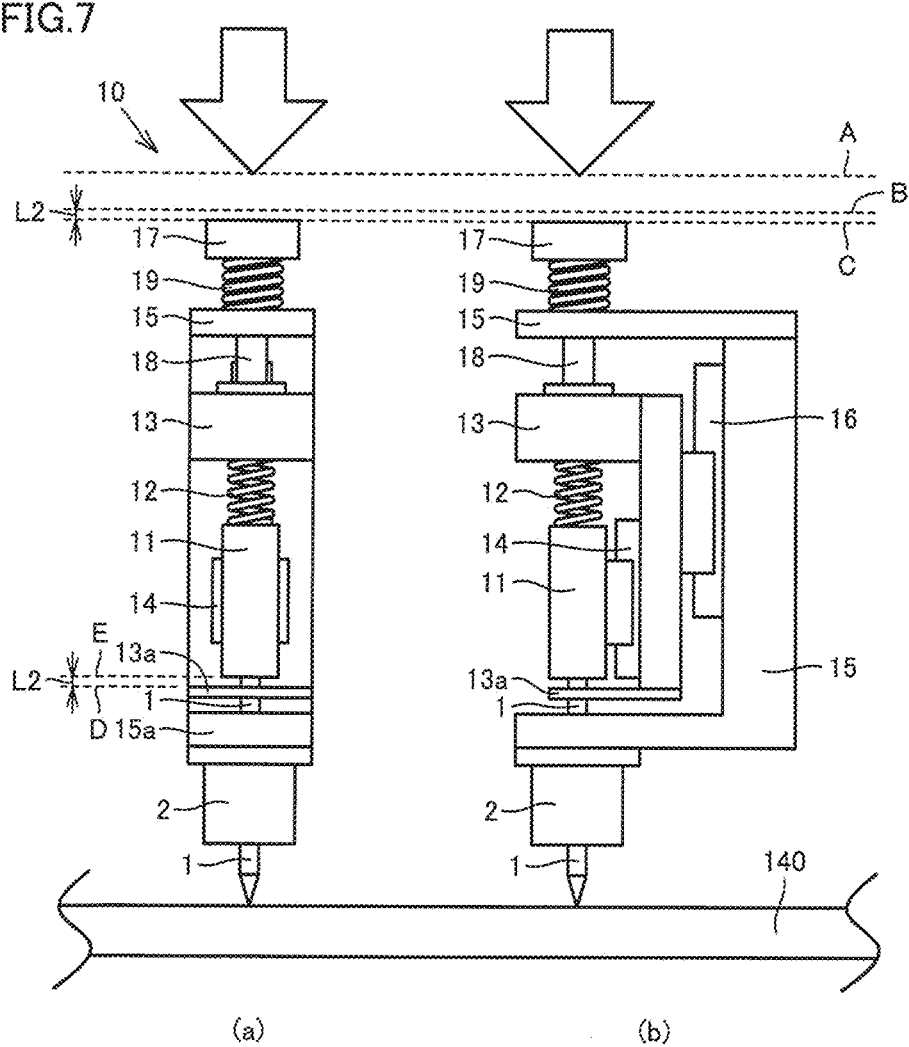
FIG. 7(*a*) is a front view showing the second state of the application needle unit shown in FIG. 3, and FIG. 7(*b*) is a side view of the application needle unit shown in FIG. 7(*a*).

As shown in FIGS. 7(a) and 7(b), passive portion 17 in the second state shown in FIGS. 6(a) and 6(b) may be further moved by movable unit 8 toward substrate 140. Also in this case, moving portion 13, which is connected through transmission portion 18 to passive portion 17, and its stopper portion 13a are guided by second guide member 16 relative to liquid material container 2 and base portion 15, which are positioned relative to substrate 140, so as to be moved in the first direction toward substrate 140. At this time, application needle 1 is already in contact with substrate 140. Thus, application needle 1 and application needle support portion 11 cannot be moved in the first direction toward substrate 140. Accordingly, first spring 12 disposed between application needle support portion 11 and moving portion 13 is compressed. Thereby, also in the case where passive portion 17 in the second state is further moved by movable unit 8 toward substrate 140, application needle 1 is not moved immediately in conjunction with this movement. Therefore, damage and breakage of substrate 140 can be prevented. At this time, through application needle 1, substrate 140 receives the elastic force of first spring 12 in proportion to moving distance L2 of passive portion 17 in the second state in the first direction. Accordingly, the spring constant of first spring 12 only has to be set such that the above-mentioned elastic force is weaker than the force of application needle 1 that may damage substrate 140.

<Configuration of Liquid Application Apparatus>

Figure 8:
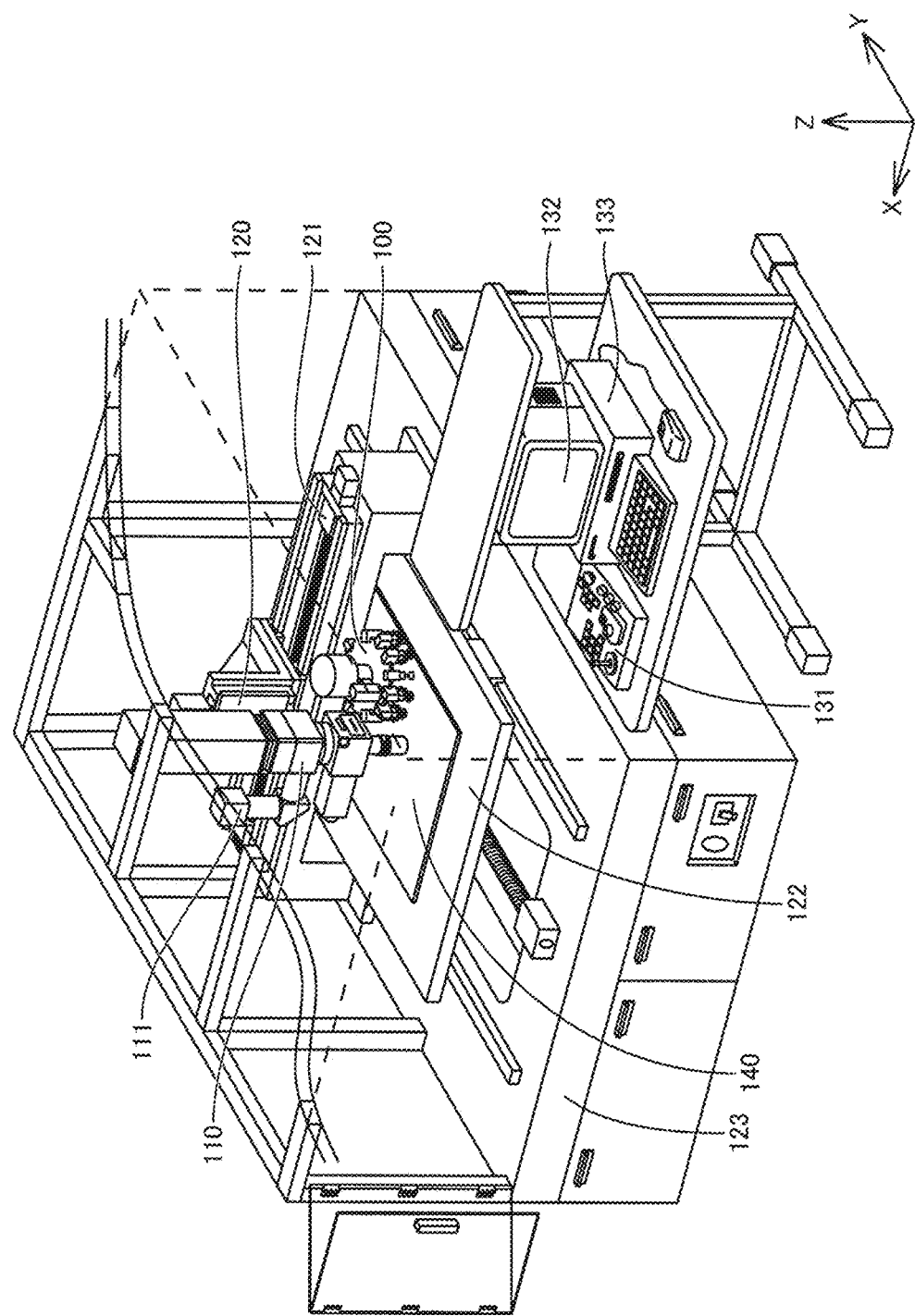
FIG. 8 is a perspective view showing a liquid application apparatus according to the present embodiment.

Then, a liquid application apparatus 200 according to the present embodiment will be described with reference to FIG. 8. Liquid application apparatus 200 includes liquid application unit 100 as described above. Liquid application apparatus 200 includes liquid application unit 100, an observation optical system 110, a CCD camera 111 connected to observation optical system 110, a Z-axis table 120, an X-axis table 121, a Y-axis table 122, a base 123, and a controller 130.

Observation optical system 110 is provided to observe an application position on substrate 140 serving as the target to which the liquid material is applied. CCD camera 111 of observation optical system 110 converts an observed image into an electrical signal. Liquid application unit 100 and observation optical system 110 are mounted on a moving body of Z-axis table 120. Accordingly, liquid application unit 100 and observation optical system 110 are supported by Z-axis table 120 to be movable in the Z-axis direction in FIG. 8. Z-axis table 120 is mounted on a moving body of X-axis table 121. Accordingly, Z-axis table 120 is supported by X-axis table 121 to be movable in the X-axis direction in FIG. 8. Substrate 140 serving as the target is installed on a moving body of Y-axis table 122. Accordingly, substrate 140 serving as the target is supported by Y-axis table 122 to be movable in the Y-axis direction in FIG. 8. Y-axis table 122 is disposed on the upper surface of base 123. Y-axis table 122 is provided to be movable in the Y-axis direction. It should be noted that the Z-axis direction in FIG. 8 corresponds to the gravity direction.

Controller 130 includes an operation panel 131, a monitor 132, and a control computer 133. Controller 130 controls liquid application unit 100, observation optical system 110, Z-axis table 120, X-axis table 121, and Y-axis table 122. Operation panel 131 is used to input a command into control computer 133. Monitor 132 displays image data converted by CCD camera 111 of observation optical system 110, and displays output data from control computer 133.

<Liquid Application Method>

Next, a liquid application method performed employing liquid application apparatus 200 will be described. In the liquid application method, first, substrate 140 as a target to which a liquid material is applied is mounted on Y-axis table 122. The application position in substrate 140 is then determined. Specifically, X-axis table 121, Y-axis table 122, and Z-axis table 120 are moved such that the application position in substrate 140 is located directly below observation optical system 110. The application position in substrate 140 is observed by observation optical system 110 and is then determined. Substrate 140 is moved by X-axis table 121, Y-axis table 122, and Z-axis table 120 such that the application position determined in this way is located directly below liquid application unit 100. Then, liquid application unit 100 applies the liquid material at the determined application position. Then, substrate 140 is moved by X-axis table 121, Y-axis table 122, and Z-axis table 120 such that the next application position is located directly below liquid application unit 100. After completion of the movement, liquid application unit 100 applies the liquid material. Each of these steps can be repeatedly performed continuously. As a result, by the liquid application method according to the present embodiment, a predetermined circuit pattern can be formed on the upper surface of substrate 140 in a short time.

<Function and Effect>

A liquid application unit 100 according to the present embodiment is a liquid application unit for applying a liquid material onto a surface of a substrate 140 as a target using an application needle. Liquid application unit 100 includes: a plurality of application needle units 10 each including an application needle 1 and a liquid material container 2 in which the liquid material is stored and from which the liquid material is supplied to application needle 1; and a first driving unit 20 configured to move application needle 1 relative to substrate 140 and liquid material container 2 in a first direction. The plurality of application needle units 10 are integrally attachable to and detachable from first driving unit 20.

In this way, at least either of application needle 1 and the liquid material can be resupplied or replaced for each of the plurality of application needle units 10 that are separated from first driving unit 20. Thus, resupply or replacement may be readily performed. Furthermore, in liquid application unit 100, the plurality of application needle units 10 each including liquid material container 2 storing a new application needle 1 and a new liquid material can also be prepared in advance before replacement. In this way, the plurality of application needle units 10 having been already attached to liquid application unit 100 can be readily and immediately replaced with new application needle units 10.

Liquid application unit 100 further includes a second driving unit 23 configured to change a relative positional relation between the plurality of application needle units 10 and first driving unit 20. The plurality of application needle units 10 are integrally attachable to and detachable from first driving unit 20 and second driving unit 23.

In this way, first driving unit 20 and second driving unit 23 can drive only application needle unit 10 among the plurality of application needle units 10, for example, that is in the prescribed positional relation to first driving unit 20. Also, at least either of application needle 1 and the liquid material can be resupplied or replaced for each of the plurality of application needle units 10 that are separated from first driving unit 20 and second driving unit 23. Thus, resupply or replacement may be readily performed.

In liquid application unit 100, the plurality of application needle units 10 are arranged side by side in an annular shape in a view seen in a first direction D1. Second driving unit 23 is configured to change a relative positional relation between each of the plurality of application needle units 10 and first driving unit 20.

In this way, second driving unit 23 (for example, the servo motor) may readily change the positions of the plurality of application needle units 10, which are disposed along circumferential direction D1, relative to first driving unit 20. Thus, according to liquid application unit 100, first driving unit 20 and second driving unit 23 can drive only application needle unit 10 among the plurality of application needle units 10, for example, that is in the prescribed positional relation to first driving unit 20.

In liquid application unit 100, each of the plurality of application needle units 10 further includes: a first spring 12 as an elastic portion that is capable of biasing application needle 1 in the first direction; a moving portion 13 that is connected to application needle 1 through first spring 12 and moved by first driving unit 20 relative to substrate 140; a base portion 15 that is fixed to first driving unit 20; and a second guide member 16 serving as a guide portion and configured to allow movement of moving portion 13 relative to base portion 15 in the first direction and configured to restrict movement of moving portion 13 relative to base portion 15 in a direction orthogonal to the first direction. Liquid application unit 100 further includes a coupling portion 30 configured to couple a plurality of base portions 15 of the plurality of application needle units 10. Second driving unit 23 is configured to drive coupling portion 30 to change the relative positional relation between the plurality of application needle units 10 and first driving unit 20. The plurality of application needle units 10 and coupling portion 30 are integrally attachable to and detachable from first driving unit 20 and second driving unit 23.

In this way, when moving portion 13 in the second state is further moved by first driving unit 20 toward substrate 140, application needle 1 cannot be moved toward substrate 140 since application needle 1 is in contact with substrate 140. Thus, first spring 12 is compressed. Accordingly, in the case as described above, application needle 1 does not move immediately in conjunction with moving portion 13. Therefore, damage and breakage of substrate 140 can be prevented.

In liquid application unit 100, liquid material container 2 is supported so as to be attachable to and detachable from base portion 15.

In this way, only the liquid material can be readily replaced.

In liquid application unit 100, liquid material container 2 is provided with: a space 2a in which the liquid material is stored; and a first hole 2b and a second hole 2c through which application needle 1 is inserted into space 2a. First hole 2b is located closer to the target than space 2a is. Second hole 2c is located on an opposite side of first hole 2b with respect to space 2a. A part of liquid material container 2 is inlaid in a part of base portion 15 so as to prevent first hole 2b and second hole 2c from interfering with application needle 1.

In this way, application needle 1 and liquid material container 2 can be readily positioned so as to prevent application needle 1 from interfering with first hole 2b and second hole 2c of liquid material container 2.

Furthermore, according to liquid application unit 100, also when container holding portion 15a has a magnet 15d, and when a relatively large magnetic attraction force acts between liquid material container 2 and container holding portion 15a, liquid material container 2 can be readily and highly accurately aligned with container holding portion 15a since a part of liquid material container 2 is inlaid in a part of base portion 15. Liquid application unit 100 as described above includes a liquid material container in which a large amount of liquid material is stored, and thus, suitable to a liquid application apparatus capable of applying a liquid material continuously for a long time.

Liquid application apparatus 200 according to the present embodiment includes: the above-mentioned liquid application unit 100; and a Y-axis table 122 configured to hold substrate 140 as a target and serving as a holding base.

Liquid application apparatus 200 as described above includes liquid application unit 100, for which at least either of the plurality of application needles 1 and the plurality of liquid materials may be readily resupplied or replaced. Therefore, according to liquid application apparatus 200, at least either of the plurality of application needles 1 and the plurality of liquid materials may be readily resupplied or replaced as compared with the conventional liquid application apparatus.

(Modifications)

Figure 9:
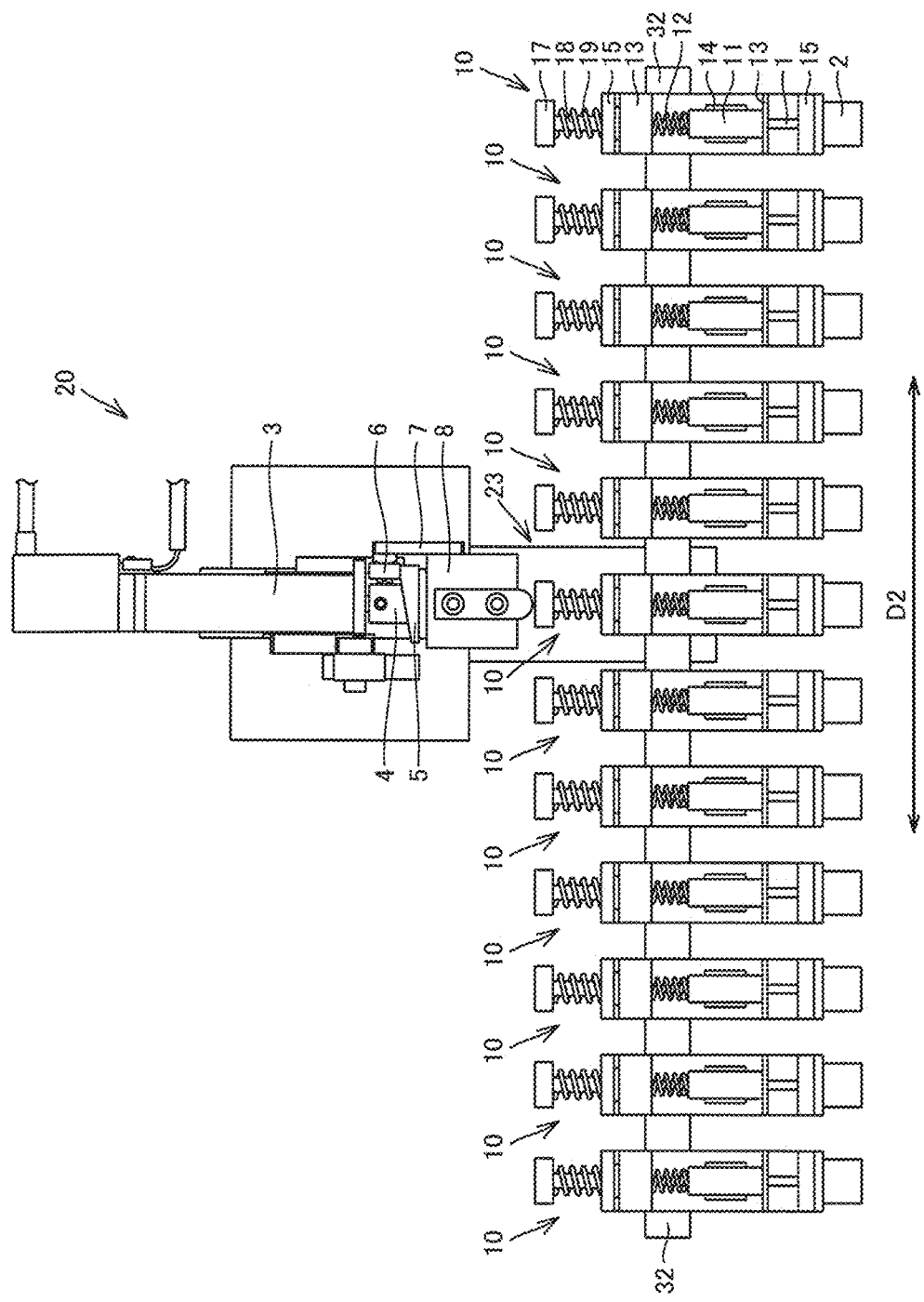
FIG. 9 is a front view showing a modification of the liquid application unit according to the present embodiment.
Figure 10:
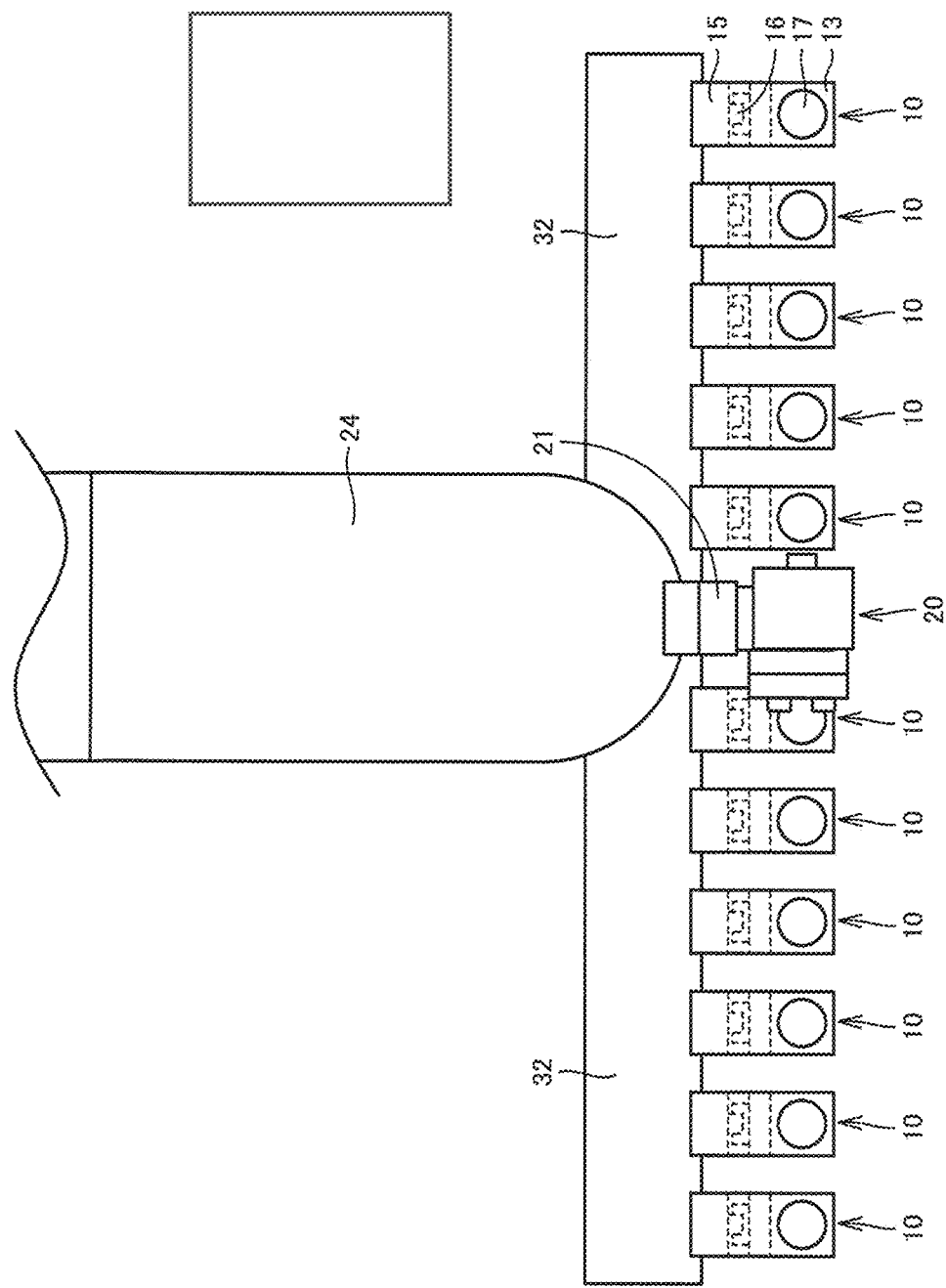
FIG. 10 is a top view of the liquid application unit shown in FIG. 9.

As shown in FIGS. 9 and 10, liquid application unit 100 as described above may include a second driving unit 23 that can change the relative positional relation between the plurality of application needle units 10 and first driving unit 20 in a second direction D2 that is orthogonal to the first direction.

Second driving unit 23 includes a linear motor, for example. The linear motor includes a fixation portion extending in second direction D2 along the horizontal direction, for example, and a movable unit that is guided by the fixation portion so as to be linearly moved in second direction D2. The movable unit is attached to a coupling portion 32 that extends in second direction D2. Second driving unit 23 is connected to a moving body of a Z-axis table 120 in a liquid application apparatus 200 (described later) through a second connection portion 24. In other words, in liquid application unit 100 as described above, the plurality of application needle units 10 may be arranged side by side in second direction D2 that is orthogonal to first direction D1. Second driving unit 23 changes the relative positional relation between each of the plurality of application needle units 10 and first driving unit 20.

Also in this way, second driving unit 23 (for example, a linear motor) may readily change the position of each of the plurality of application needle units 10, which are disposed in second direction D2, relative to first driving unit 20. Thus, according to liquid application unit 100, first driving unit 20 and second driving unit 23 can drive only application needle unit 10 among the plurality of application needle units 10, for example, that is in a prescribed positional relation to first driving unit 20.

Figure 11:
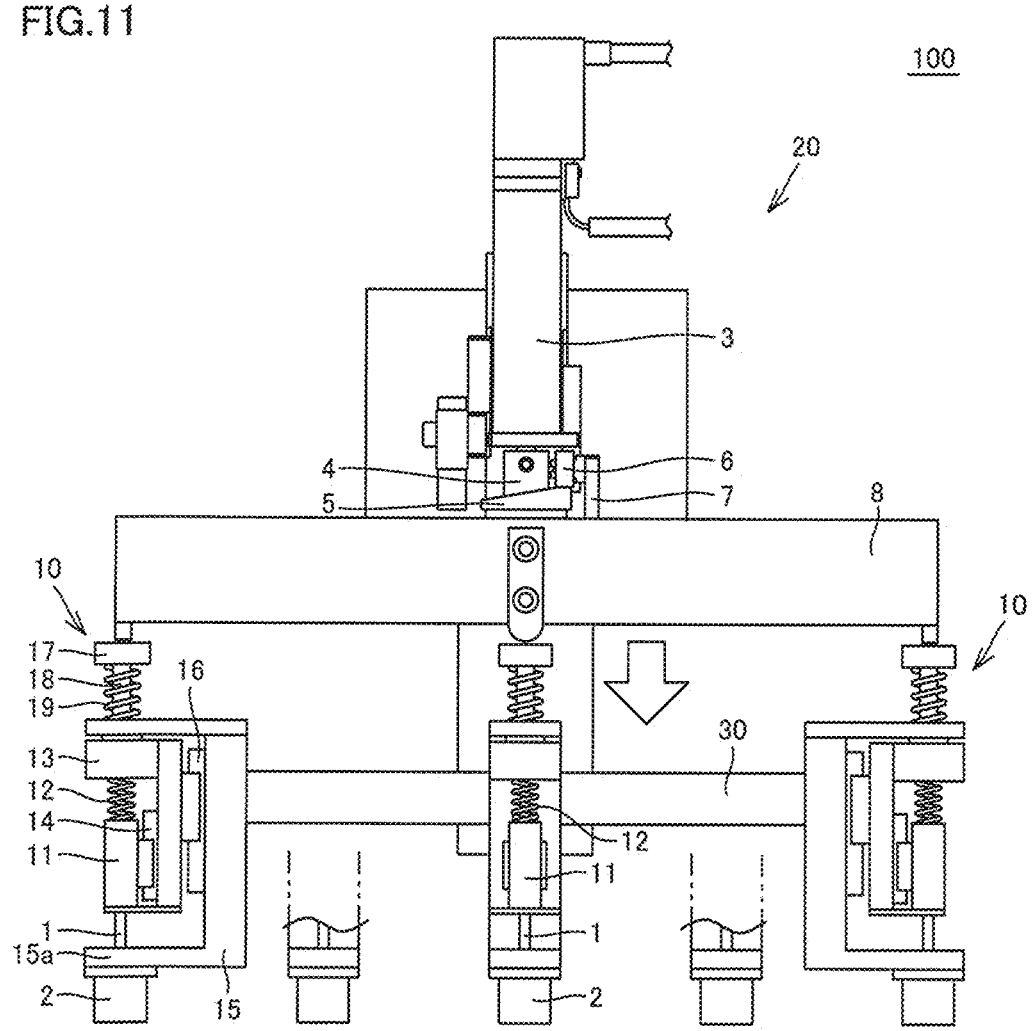
FIG. 11 is a front view showing a modification of the liquid application unit according to the present embodiment.

Liquid application unit 100 may be configured such that the plurality of application needle units 10 can be integrally driven by first driving unit 20. For example, movable unit 8 of first driving unit 20 may be able to press each of passive portions 17 in their respective application needle units 10. In the case where the plurality of application needle units 10 are arranged side by side in an annular shape as shown in FIG. 11, movable unit 8 has an annular shape in a plan view see in the first direction, for example. In the case where the plurality of application needle units 10 are arranged linearly, movable unit 8 has a rectangular shape in a plan view seen in the first direction. In a different point of view, liquid application unit 100 does not need to include second driving unit 23. Also in such liquid application unit 100, as long as the plurality of application needle units 10 are integrally attachable to and detachable from first driving unit 20, at least either of application needle 1 and the liquid material can be resupplied or replaced for each of the plurality of application needle units 10 that are separated from first driving unit 20. Accordingly, resupply or replacement as described above may be readily performed also in liquid application unit 100.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The present invention is particularly advantageously applied to a liquid application unit including a plurality of application needles and a plurality of liquid material containers, and to a liquid material application apparatus including this liquid application unit.

REFERENCE SIGNS LIST 1 application needle, 2 liquid material container, 2a space, 2b first hole, 2c second hole, 3 servo motor, 4 rotation member, 5 cam member, 6 bearing, 7 connection member, 8 movable unit, 10 application needle unit, 11 application needle support portion, 12 first spring, 13 moving portion, 13a stopper portion, 14 first guide member, 15 base portion, 15a container holding portion, 15b through hole, 15c protruding portion, 15d magnet, 16 second guide member, 17 passive portion, 18 transmission portion, 19 second spring, 20 first driving unit, 21 first connection portion, 22 support portion, 23 second driving unit, 24 second connection portion, 30, 32 coupling portion, 100 liquid application unit, 110 observation optical system, 111 camera, 120, 121, 122 axis table, 123 base, 130 controller, 131 operation panel, 132 monitor, 133 control computer, 140 substrate, 200 liquid application apparatus.

The invention claimed is:

1. A liquid application unit for applying a liquid material onto a surface of a target using an application needle, the liquid application unit comprising:
a plurality of application needle units each including the application needle and a liquid material container in which the liquid material is stored and from which the liquid material is supplied to the application needle;
a support that supports the plurality of application needle units and prevents movement of the plurality of application needles relative to the support;
a push mechanism configured to move the application needle relative to the target and the liquid material container in a first direction; and
a rotation mechanism configured to change a relative positional relation between the plurality of application needle units and the push mechanism,
wherein the plurality of application needle units are integrally attachable to and detachable from the push mechanism and the rotation mechanism,
wherein each of the plurality of application needle units further includes
a first elastic electric member that is configured to bias the application needle in the first direction,
a moving portion that has a wall having a first side and a second side that is connected to the application needle through the first elastic electric member, and moved by the push mechanism relative to the target,
a base portion that is fixed to the push mechanism and has a first top wall, a rod externally inserted inside the base portion through the first top wall of the base portion, the rod having a first end to be coupled to the push mechanism and a second end that is in contact with the first side of the wall of the moving portion, and a second elastic member disposed between the first end of the rod and the first top wall of the base portion to bias the first end away from the first top wall, wherein the application needle is biased by the first elastic member toward the target relative to the moving portion, wherein the first elastic member is arranged between the second side of the wall of the moving portion and the application needle, wherein (1) the rod and the second elastic member, (2) the wall of the moving portion, (3) the first elastic member, and (4) the application needle are aligned in that order along the first direction, and wherein the push mechanism pushes the rod to move the moving portion, the first elastic member, and the application needle in the first direction in order to apply the liquid material to the surface of the target.

2. The liquid application unit according to claim 1, wherein
the plurality of application needle units are arranged side by side in a second direction that is orthogonal to the first direction, and
the rotation mechanism is configured to change a relative positional relation between each of the plurality of application needle units and the push mechanism.

3. The liquid application unit according to claim 1, wherein
the plurality of application needle units are arranged side by side in an annular shape in a view seen in the first direction, and
the rotation mechanism is configured to change a relative positional relation between each of the plurality of application needle units and the push mechanism.

4. The liquid application unit according to claim 1, wherein
each of the plurality of application needle units includes a guide portion configured to
allow movement of the moving portion relative to the base portion in the first direction, and
restrict movement of the moving portion relative to the base portion in a direction orthogonal to the first direction,
the liquid application unit further comprises a coupling portion configured to couple a plurality of the base portions of the plurality of application needle units,
the rotation mechanism is configured to drive the coupling portion to change the relative positional relation between the plurality of application needle units and the push mechanism, and
the plurality of application needle units and the coupling portion are integrally attachable to and detachable from the push mechanism and the rotation mechanism.

5. The liquid application unit according to claim 4, wherein the liquid material container is supported so as to be attachable to and detachable from the base portion.

6. The liquid application unit according to claim 5, wherein
the liquid material container is provided with:
a space in which the liquid material is stored; and
a first hole and a second hole through which the application needle is inserted into the space,
the first hole is located closer to the target than the space is,
the second hole is located on an opposite side of the first hole with respect to the space, and
a part of the liquid material container is inlaid in a part of the base portion so as to prevent the first hole and the second hole from interfering with the application needle.

7. A liquid application apparatus comprising:
the liquid application unit according to claim 1; and
a holding base configured to hold the target.

8. The liquid application unit according to claim 2, wherein
each of the plurality of application needle units includes a guide portion configured to
allow movement of the moving portion relative to the base portion in the first direction, and
restrict movement of the moving portion relative to the base portion in a direction orthogonal to the first direction,
the liquid application unit further comprises a coupling portion configured to couple a plurality of the base portions of the plurality of application needle units,
the rotation mechanism is configured to drive the coupling portion to change the relative positional relation between the plurality of application needle units and the push mechanism, and
the plurality of application needle units and the coupling portion are integrally attachable to and detachable from the push mechanism and the rotation mechanism.

9. The liquid application unit according to claim 8, wherein the liquid material container is supported so as to be attachable to and detachable from the base portion.

10. The liquid application unit according to claim 9, wherein
the liquid material container is provided with:
a space in which the liquid material is stored; and
a first hole and a second hole through which the application needle is inserted into the space,
the first hole is located closer to the target than the space is,
the second hole is located on an opposite side of the first hole with respect to the space, and
a part of the liquid material container is inlaid in a part of the base portion so as to prevent the first hole and the second hole from interfering with the application needle.

11. The liquid application unit according to claim 3, wherein
each of the plurality of application needle units includes a guide portion configured to
allow movement of the moving portion relative to the base portion in the first direction, and
restrict movement of the moving portion relative to the base portion in a direction orthogonal to the first direction,
the liquid application unit further comprises a coupling portion configured to couple a plurality of the base portions of the plurality of application needle units,
the rotation mechanism is configured to drive the coupling portion to change the relative positional relation between the plurality of application needle units and the push mechanism, and
the plurality of application needle units and the coupling portion are integrally attachable to and detachable from the push mechanism and the rotation mechanism.

12. The liquid application unit according to claim 11, wherein the liquid material container is supported so as to be attachable to and detachable from the base portion.

13. The liquid application unit according to claim 12, wherein
the liquid material container is provided with:
a space in which the liquid material is stored; and
a first hole and a second hole through which the application needle is inserted into the space,
the first hole is located closer to the target than the space is,
the second hole is located on an opposite side of the first hole with respect to the space, and
a part of the liquid material container is inlaid in a part of the base portion so as to prevent the first hole and the second hole from interfering with the application needle.

14. The liquid application unit according to claim 1,
wherein the base portion having a first bottom wall opposite the first top wall, and a side wall between the first top wall and the first bottom wall, the base portion being supported by the support, the first bottom wall having a first surface facing the first top wall and a second surface, opposite the first surface, to which the liquid material container is coupled;
wherein the moving portion slidably supported by the base portion and movable between the first top wall and the first bottom wall in the first direction, the moving portion having a second top wall as the wall having the first side and the second side under the first top wall and a second bottom wall opposite the second top wall and above the first bottom wall, and further including a needle holder, disposed on the second bottom wall, holding one end of the application needle, the application needle extending in the first direction from the needle holder through the first and second bottom walls into the liquid container, and
wherein the first elastic member disposed between the second top wall and the needle holder to bias the needle holder in the first direction to the second bottom wall.

* * * * *